US010118176B2

(12) United States Patent
Gray et al.

(10) Patent No.: US 10,118,176 B2
(45) Date of Patent: Nov. 6, 2018

(54) SAMPLE-TUBE HOLDER FOR EASY TUBE INSERTION AND REMOVAL

(71) Applicant: OMNI INTERNATIONAL, INC., Kennesaw, GA (US)

(72) Inventors: Thomas Gray, Canton, GA (US); John Hancock, Atlanta, GA (US); Spencer Smith, Marietta, GA (US); Voya Vidakovic, Marietta, GA (US)

(73) Assignee: Omni International, Inc., Kennesaw, GA (US)

( * ) Notice: Subject to any disclaimer, the term of this patent is extended or adjusted under 35 U.S.C. 154(b) by 115 days.

(21) Appl. No.: 14/884,989

(22) Filed: Oct. 16, 2015

(65) Prior Publication Data

US 2016/0107158 A1 Apr. 21, 2016

Related U.S. Application Data

(60) Provisional application No. 62/065,068, filed on Oct. 17, 2014.

(51) Int. Cl.

| | |
|---|---|
| ***B01L 3/00*** | (2006.01) |
| ***G01N 37/00*** | (2006.01) |
| ***B01F 11/00*** | (2006.01) |
| ***B01L 9/00*** | (2006.01) |

(52) U.S. Cl.
CPC ......... *B01L 3/5082* (2013.01); *B01F 11/0008* (2013.01); *B01L 9/50* (2013.01)

(58) Field of Classification Search
CPC .. B01L 3/5082; B01L 9/50; B01L 9/06; B01L 9/54; B01F 11/0008; B04B 5/041; B04B 2005/0435
USPC ..... 73/864.91; 211/74, 75, 82; 220/737, 742
See application file for complete search history.

(56) References Cited

U.S. PATENT DOCUMENTS 822,984 A * 6/1906 Richter .................. A47B 73/00 206/446
1,236,929 A * 8/1917 Hauck .................... A47G 29/18 211/74
2,717,700 A * 9/1955 Gruzensky et al. ......................... B01F 11/0008 211/1.51
4,956,103 A * 9/1990 Jessop et al. ....... B01L 3/50825 210/787

(Continued)

*Primary Examiner* — Lisa Caputo
*Assistant Examiner* — Roger Hernandez-Prewit
(74) *Attorney, Agent, or Firm* — Gardner Groff Greenwald & Villanueva, PC

(57) ABSTRACT

A tube holder for mounting a sample-tube assembly to a homogenizing device includes at least one clamp, at least one retainer, and a mount. The mount couples the tube holder to the homogenizing device. Each clamp defines a tube channel and a transverse ledge surface, with the tube channel having a lateral opening through which a tube of the tube assembly can be easily inserted and removed for example with one hand. And each retainer defines a retaining surface that extends over the respective tube channel and opposes the respective ledge surface to cooperatively form a receptacle that receives/retains a cap of the tube assembly against axial tube motion during homogenization. In some embodiments, multiple retaining surfaces are included for retaining different types of tube assemblies, multiple clamps and retainers are included for holding multiple tube assemblies simultaneously, and/or ejection mechanisms are included for ease of ejecting the tube assemblies.

20 Claims, 13 Drawing Sheets

(56) References Cited

U.S. PATENT DOCUMENTS

| | | | | |
|---|---|---|---|---|
| 5,655,673 | A * | 8/1997 | Weterrings et al. | A47B 81/00 211/74 |
| 7,910,067 | B2 | 3/2011 | Knight et al. | |
| 2015/0063056 | A1 * | 3/2015 | Kral et al. | B01F 15/00746 366/110 |

* cited by examiner

FIG.2
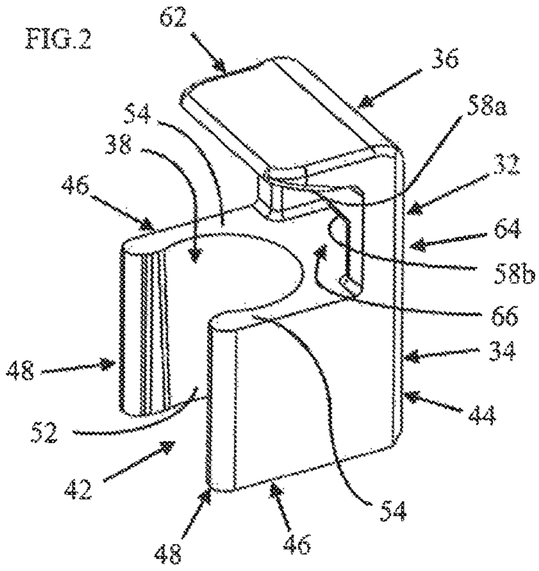
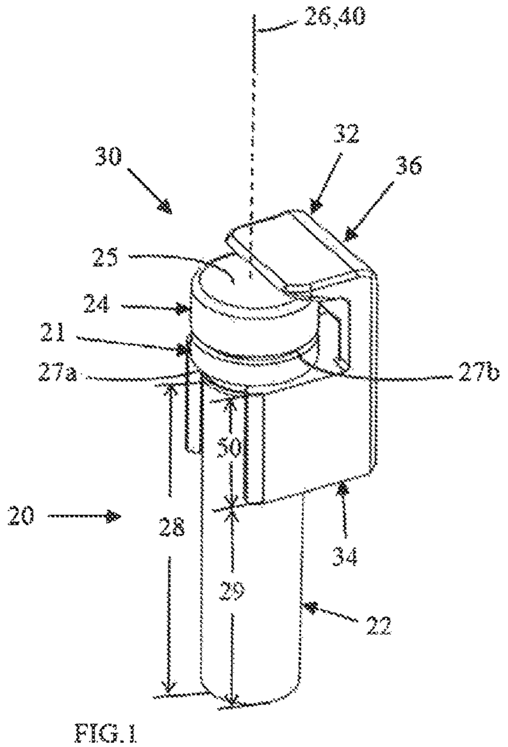
FIG.1

SAMPLE-TUBE HOLDER FOR EASY TUBE INSERTION AND REMOVAL

CROSS-REFERENCE TO RELATED APPLICATION

This application claims the priority benefit of U.S. Provisional Patent Application Ser. No. 62/065,068, filed Oct. 17, 2014, which is hereby incorporated herein by reference.

TECHNICAL FIELD

The present invention relates generally to laboratory devices and accessories for homogenizing sample materials, and particularly to holders for mounting sample tubes to the homogenizing devices to homogenize the samples in the tubes.

BACKGROUND

Homogenization involves disaggregating or emulsifying the components of a sample using a high-shear process with significant micron-level particle-size reduction of the sample components. Homogenization is commonly used for a number of laboratory applications such as creating emulsions, reducing agglomerate particles to increase reaction area, cell destruction for capture of DNA material (proteins, nucleic acids, and related small molecules), DNA and RNA amplification, and similar activities in which the sample is bodily tissue and/or fluid, or another substance. Conventional high-powered mechanical-shear homogenization devices for such applications are commercially available in various designs to generate for example vigorous axially reciprocating and/or circular (e.g., "swashing") oscillating motions and resulting forces. The samples are held in sample tubes that are mounted to tube holders that are in turn mounted to the homogenization device such that the vigorous oscillating motions and forces are transmitted through the tube holders and the tubes to the contained samples.

These homogenization devices have proven generally beneficial in accomplishing the desired homogenization of the samples. But in use they have their disadvantages. For example, in some devices the sample tubes are cumbersome and/or difficult to mount to the tube holders, with both hands of a user required to laboriously attach the tube and then both hands required to laboriously remove it.

Accordingly, it can be seen that needs exist for improvements in homogenization devices relating to ease of mounting the sample tubes in place. It is to the provision of solutions to these and other problems that the present invention is primarily directed.

SUMMARY

Generally described, the present invention relates to a tube holder for mounting a tube assembly to a homogenizing device to homogenize a sample in the tube assembly. The tube holder includes at least one clamp, at least one retainer, and a mount. The mount couples the tube holder to the homogenizing device. Each clamp defines a tube channel and a transverse ledge surface, with the tube channel having a lateral opening through which a tube of the tube assembly can be easily inserted and removed for example with one hand. And each retainer defines a retaining surface that extends over the respective tube channel and opposes the respective ledge surface to cooperatively form a receptacle that receives/retains a cap of the tube assembly against axial tube motion during homogenization. In some embodiments, multiple retaining surfaces are included for retaining different types of tube assemblies, multiple clamps and retainers are included for holding multiple tube assemblies simultaneously, and/or ejection mechanisms are included for ease of ejecting the tube assemblies.

The specific techniques and structures employed to improve over the drawbacks of the prior devices and accomplish the advantages described herein will become apparent from the following detailed description of example embodiments and the appended drawings and claims.

BRIEF DESCRIPTION OF THE DRAWINGS

FIG. 1 is a perspective view of a tube holder according to a first example embodiment of the present invention, shown in use holding a sample tube.

FIG. 2 shows the tube holder of FIG. 1 without the sample tube.

DESCRIPTION OF EXAMPLE EMBODIMENTS

Figure 3:
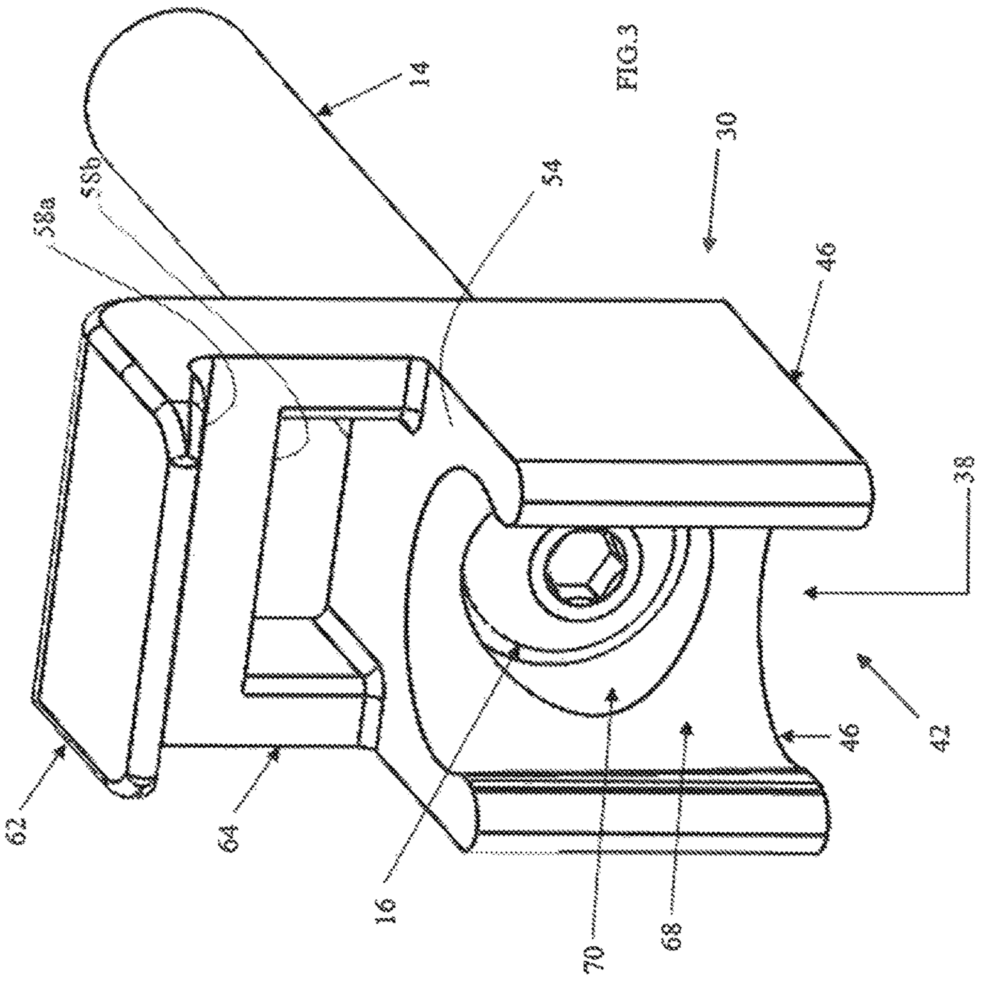
FIG. 3 is a perspective view of the tube holder of FIG. 1, shown with a mount to a homogenizing device.

The present invention relates to improved tube holders for easy mounting and removing of sample tubes to and from a homogenization device. The tube holders provide for simple, quick, and easy insertion and removal of the sample tubes, for example by one hand of a user, while still securely holding the tubes during homogenization of the samples in the tubes.

The tube holders can be configured for holding tubes of a variety of different types for homogenizing samples of a variety of different types. In typical embodiments, for example, the tube holders are sized and shaped for use with 2 mL cylindrical tubes with a length of about 4.5 cm and a diameter of about 1 cm, or sized and shaped for use with 35 mL cylindrical, conical-bottom tubes with a length of about 8.0 cm and a diameter of about 3.0 cm. All dimensions used herein are representative to assist in clearly illustrating example embodiments of the invention and thus are not limiting of the invention in any way, unless the context clearly dictates otherwise.

In other embodiments, the tube holders are sized and shaped for use with tubes of other sizes and shapes, and as such the invention is not limited to tube-holder configurations for use with the specific tubes disclosed herein. Accordingly, the term “tube” as used herein is intended to be broadly construed to include any sealable container that can hold a sample during homogenization and is not necessarily limited to conventional clear, plastic, cylindrical vials. And the term “sample” as used herein is intended to be broadly construed to cover any type of substance that can be homogenized and for which homogenization could be useful, such as but not limited to human or non-human bodily fluid and/or tissue (e.g., blood, bone-marrow cells, a coronary artery segment, or pieces of organs), other organic matter (e.g., plants or food), and/or other chemicals.

In addition, the tube holders can be configured for mounting to homogenizing devices of a variety of different types. In typical embodiments, for example, the tube holders are sized and shaped for mounting to and use with homogenizing devices that generate vigorous axially reciprocating and/or circular (e.g., “swashing”) oscillating motions and resulting forces. Such homogenizing devices include not just conventional homogenizers but also shakers, bead mills, vortexers, centrifuges, other sample-agitation devices, and other devices (not limited to those commonly referred to as homogenizers) for processing samples by generating and applying vigorous oscillating agitation forces, for laboratory and/or other applications. As such, the invention is not limited to tube-holder configurations for mounting to and use with the specific homogenizing devices disclosed herein. And as used herein the term “processing” means particle-size reduction of the sample by use of one or more of the homogenizing devices disclosed herein or one or more other devices for sample particle-size reduction as are known to persons of ordinary skill in the art.

Turning now to the drawings, FIGS. 1-7 show a tube holder 30 according to a first example embodiment of the invention. The tube holder 30 mounts a sample-tube assembly 20 to a homogenization device 10 for use in homogenizing the sample contained in the tube assembly. The sample-tube assembly 20 is removably held by the tube holder 30, includes a tube 22 that contains the sample, and includes a cap 24 that removably couples (e.g., by mating screw threads, as depicted) to the tube to seal the sample in it. And the homogenization device 10 includes an agitator system 12 that generates the agitation forces and a mount 14 to which the tube holder 30 removably couples.

The tube holder 30 includes a main body 32 with a clamp 34 for securely holding the tube 22 in a use position and a retainer 36 for securely retaining the tube cap 24 in the use position. The main body 32 can be made of a single integral piece of a material (as depicted) including these major parts, or it can be made of separate parts assembled together, using conventional materials (e.g., plastic and/or metal) and using conventional fabrication equipment and techniques (e.g., molding).

The tube holder 30 is configured with its cap retainer 36 positioned above its tube clamp 34 in applications in which the tube 22 is held upright with its cap 24 on top, and for convenience the tube holder and tube are described herein in that orientation. In some applications, the same tube holder 30 and tube 22 are mounted to a homogenizing device 10 in an inverted, horizontal, angled, or other orientation. As such, reference to the relative positions of the components of the tube holder 30 is not intended to be unnecessarily limiting beyond accomplishing the intended functionality as described herein.

The tube-holding clamp 34 includes a tube channel 38 having a longitudinal axis 40 and a transverse open access side 42. The channel axis 40 is generally vertically extending and the open side 42 is generally laterally positioned when the clamp 34 is positioned for upright use, and as such these elements are sometimes referred to accordingly. The tube 22 is securely held in the channel 38 in the use position (FIG. 7) with the tube axis 26 coexistent with the channel axis 40. In this way, the tube 22 can be inserted into and removed from the channel 38 generally laterally through its open lateral side 42.

For example, in the depicted embodiment the tube-holder clamp 34 includes a back wall 44 and two arms 46 projecting laterally from it in a generally parallel and spaced arrangement to collectively define the tube channel 38. The tube channel 38 typically has generally the same plan-view shape as the tube 22, for example cylindrical as depicted, though other plan-view shapes such as polygonal can be used for the tube channel. And the tube channel 38 typically extends more than halfway about the tube 22 to securely hold the tube in the use position, for example in a “C” shape, with tips 48 of the laterally-extending clamp arms 46 positioned laterally past the tube axis 26 (as depicted). As such, the open lateral side 42 has an at least nominally smaller lateral dimension that the tube channel 38 (and thus the tube 22) when the clamp arms 46 are in the use position.

In order to removably hold the tube 22 in the tube channel 38, the arms 46 include a resilient feature to provide for example a snap-fit or detent coupling and permit lateral removal of the tube. In the depicted embodiment, the arms 46 are resiliently deflectable so that they are deflected slightly outwardly (laterally away from each other) to tightly clamp on the tube 22 (by laterally inward compressive forces) when the tube and the arms are in the use position (FIG. 7), and they resiliently deflect from a neutral position (FIGS. 2 and 5), outwardly through a deflected position (FIG. 6), and back inwardly to the use position as the tube 22 is inserted through the open lateral side 42 into the tube channel 38 for use. Similarly, the arms 46 resiliently deflect through the reverse sequence to remove the tube 22 from the tube channel 38. As such, the curve of the cylindrical tube 22 functions as a ramp across which the arm tips 48 ride to force their outward deflection, and the arm tips can also include a ramped (curved or otherwise angled) inner surface to facilitate this outward deflection. And with the arms 46 in the neutral position, the tube channel 36 typically has an at least nominally smaller lateral dimension (e.g., diameter) than the tube 22. In this way, the inward compressive forces of the clamp arms 46 on the tube 22 securely hold it in place mounted to the tube holder 30, without any additional wall, arm, or other structure that pivots or otherwise moves between an open position for tube insertion/removal and a closed position closing off the open lateral side 42.

In other embodiments, one of the arms is resiliently deflectable and the other is not. For example, a two-channel embodiment can include a common center arm that is rigid and two side arms (one per channel) that are resiliently deflectable. In yet other embodiments, one or both of the arms is generally rigid but laterally pivotal and resiliently biased (e.g., by a spring) inwardly toward the neutral position. In still other embodiments, one or both of the arms is generally rigid but includes a resilient gate member (e.g., a spring-biased pin or wall, or a deformable gel strip or boss) that retracts (e.g., linearly) and is spring-biased toward an extended neutral position. In yet other embodiments, the arms each include a rigid outer wall and an inner wall that is compliant enough to resiliently deflect. And in yet still other embodiments, both arms are rigid for use in applications in which the tube walls are compliant enough to resiliently deflect. Reference herein to the “resilient feature” of the arms 46 includes these and other embodiments.

In order to facilitate easy insertion and removal of the tube 22 relative to the tube channel 38, the height 50 of the arms 46 (and typically also the channel 38) is typically selected so that it does not extend along the entire length 28 (i.e., height) of the tube 22 extending (exposed) below the cap 24. Accordingly, a length 29 of the tube 22 extends below (opposite the cap retainer 36) the arms 46, with this length sufficiently long to permit accessing and applying an insertion and/or removal force on that access-length portion of the tube. In typical embodiments, the access-portion tube length 29 is sufficiently long to permit gripping by one or more average-sized adult human fingers and/or mechanical tools, for example it can be about 2.0 cm to about 4.0 cm. In such embodiments, the height (length) 50 of the clamp arms 46 can be for example about 1.0 cm to about 3.0 cm, for use with a tube 22 having a total length (height) of for example about 4.0 cm to about 5.0 cm. For reference, the clamp arms 46 of such embodiment can have for example a depth (extending laterally from the back wall 44) of about 2.0 cm to about 3.0 cm.

This design also is advantageous because it reduces material costs by not extending along the entire exposed-tube length 28. With this design, sufficiently strong tube-holding clamping forces are provided by the smaller inner surface area 52 of the arms 46 that contacts and grips the tube 22. In other embodiments, the clamp arms extend then entire length of the tube to enclose it on three sides, or an array of clamps arms are provided with a pair for gripping an upper portion of the tube and another axially-aligned pair for gripping a lower portion of the tube.

In addition, the top surface 54 of the clamp arms 46 forms a ledge against (e.g., upon) which a projecting peripheral edge surface of the tube assembly 20 can abut, for example the bottom peripheral projecting surface 27*b* of the tube cap 24 or the bottom peripheral projecting surface 27*a* of a flange 21 of the tube body 22. As such, the clamp arm-top ledge surface 54 functions as a mechanical stop that interferes with and thus prevents the tube cap 24, and thus the tube 22 attached to it, from moving axially downward (past it) relative to the upright main body 32 of the tube holder 30 when in the use position. As used herein, the arm-top ledge surface can additionally (or alternatively) include the top surface portion of the back wall 44.

Having described the tube-holding clamp 34, the cap-holding retainer 36 of the main body 32 of the tube holder 30 will now be detailed. The cap-holding retainer 36 securely retains the tube cap 24 in the use position, as mentioned above. The cap-holding retainer 36 includes at least one retaining surface (58*a* or 58*b*, collectively “the retaining surface 58”) that is positioned above and spaced apart from the clamp arm-top ledge surface 54 to cooperatively define a receptacle or gap 56 into which the tube cap 24 is received. In this way, each retaining surface 58 functions as a mechanical stop that interferes with and thus prevents the tube cap 24, and thus the tube 22 attached to it, from moving axially upward (past it) relative to the upright main body 32 of the tube holder 30 when in the use position.

In typical embodiments, the cap-holding retainer 36 includes a first retaining surface 58*a* and a second retaining surface 58*b* each opposing the clamp arm-top ledge surface 54 but vertically spaced different distances from it to accommodate different thickness caps 24 of different tube types and designs. For example, the first retaining surface 58*a* can be formed on a transverse cantilever arm 62 that extends laterally over a least a portion of the tube channel 38 (and thus extends laterally over the tube cap 24 in the use position) and that extends laterally from an upright extension arm 64 that in turn extends upward from the clamp 36. As depicted, the transverse cantilever arm 62 can be in the form of a generally horizontal wall or panel, though alternatively it can be a pin, a plurality of projections, or another structure extending laterally over a least a portion of the tube channel. The first retaining surface 58 thus abuts against a top surface 25 of the tube cap 24 in the use position to function as a mechanical stop that interferes with and thus prevents the tube cap, and thus the tube 22 attached to it, from moving axially upward (past it) relative to the upright main body 32 of the tube holder 30 when in the use position. Some or all of these components (cantilever arm, upright extension arm, clamp arms) can be considered to be part of the main body 32 (as in the unitary one-piece embodiment depicted) or they can be considered to be individual parts extending from and/or attached to the main body).

To accommodate relatively small differences in the thickness of the various tube caps 24, the first retaining surface 58 can be ramped downward from front (lateral opening 42 side) to back (back wall 44 side). The ramped retaining surface 58 can be flat or curved so long as it forms an angle from horizontal in the upright use position. The ramp can extend over the entire first retaining surface 58 or only a portion of it, as desired. In this way, as the tube 22 is inserted laterally into the tube channel 38, the ramped retaining surface 58 is contacted at some point by the cap 24, with this interfering contact preventing the tube assembly 20 from moving axially upward.

And the second retaining surface 60 can be formed for example by a retainer opening 66 in the upright extension arm 64. The retainer opening 66 can be a through-hole (as depicted) or a recess, and the upright extension arm 64 can be a wall or panel with the opening laterally centrally positioned (as depicted) in it to thereby form two vertical members one on each side of the opening. The second retaining surface 60 does not extend laterally over the tube channel 38 (and thus does not extend laterally over the tube cap 24 in the use position), thereby permitting use with tube caps 24 to be retained by the first retaining surface 58. That is, the second retaining surface 60 is laterally offset from and clear of the tube channel 38, but still positioned adjacent the tube channel. So a lateral tab 23*a* of another type of tube cap 24*a* (see, e.g., FIGS. 8-10) can be inserted into the retainer opening 66, with the second retaining surface 60 thus abutting against the cap's lateral tab in the use position to function as a mechanical stop that interferes with and thus prevents the tube cap, and thus the tube 22*a* attached to it, from moving axially upward (past it) relative to the upright main body 32 of the tube holder 30 when in the use position.

In other embodiments, the tube holder includes only one of the first and second retaining surfaces 58*a* and 58*b*. In other embodiments, the tube holder includes one of the first and second retaining surfaces in combination with one or more other retaining surfaces, for example retaining members that are laterally-pivotal or linearly slidable between use and stored positions.

Figure 4:
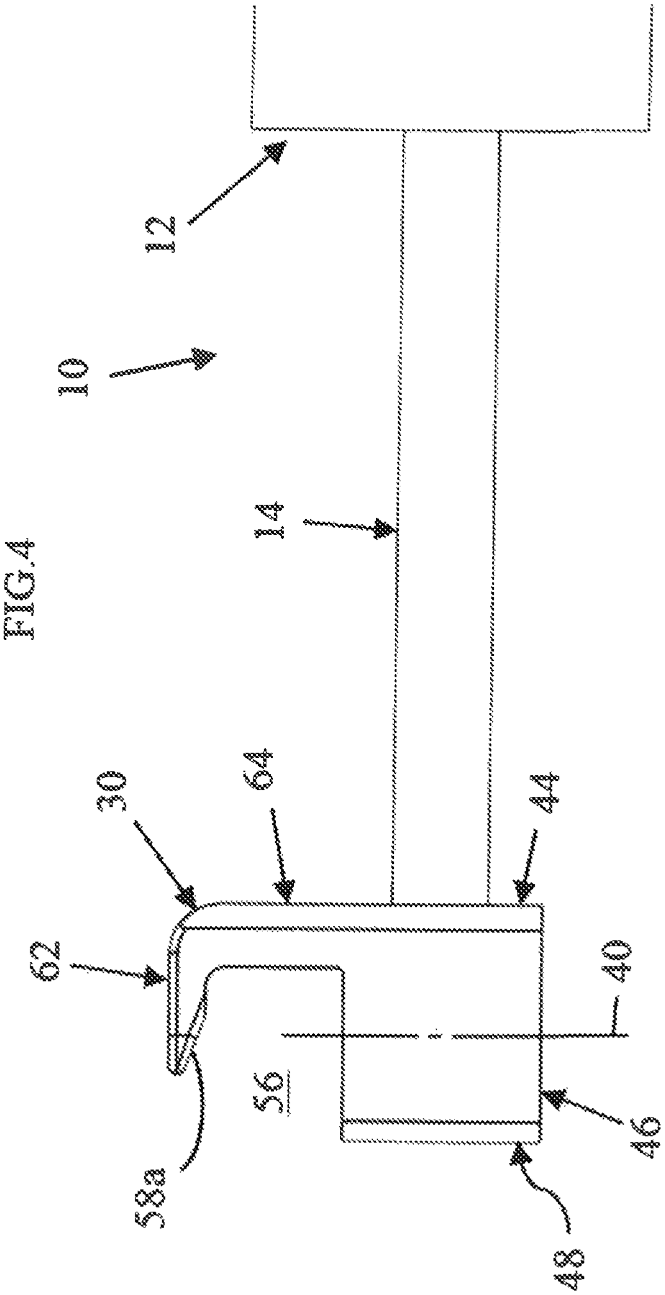
FIG. 4 is a side view of the tube holder and mount of FIG. 3.

In addition, the tube holder 30 includes a mount 68 that removably couples to the homogenizer mount 14 (see, e.g., FIGS. 3-4). The tube-holder mount 68 can be provided by numerous different conventional mounting structures, and those disclosed herein are representative for illustration purposes and not limiting of the invention. The tube-holder mount 68 can be selected in part based on the particular homogenizer mount 14 to which it is to be attached. As such, the selection and design particulars of the tube-holder mount 68 can be readily determined by persons of ordinary skill in the art, so exacting details are not described herein. As just one of many examples, the depicted homogenizer mount 14 includes an extension arm with an internally-threaded hole (not shown) that receives an externally-threaded fastener such as the depicted bolt 16. As just one of many examples for use with this homogenizer mount 14, the depicted tube-holder mount 68 is in the form of a counter-sunk opening 70 in the back wall 44 of the tube-holder body 32 through which is received the fastener 16.

Figure 5:
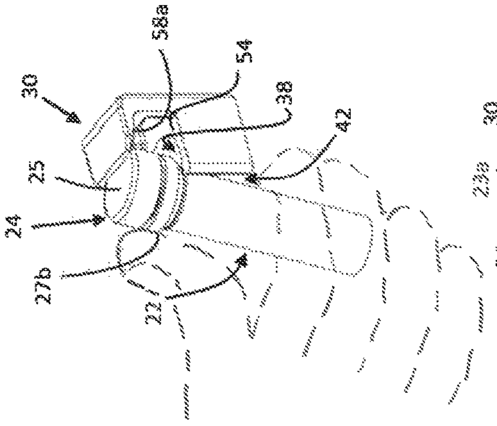
FIG. 5 is a perspective view of the tube holder and sample tube of FIG. 1, showing the tube in a ready position according to a method of installing the tube onto the tube holder.
Figure 6:
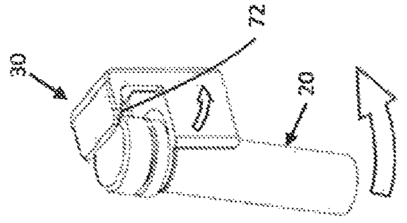
FIG. 6 shows the tube being pivoted into the tube holder of FIG. 5 according to the method of installing the tube onto the tube holder.
Figure 7:
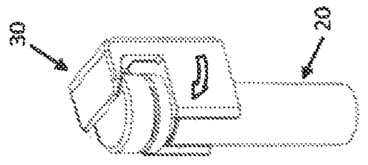
FIG. 7 shows the tube and the tube holder of FIG. 6 in a use position according to the method of installing the tube onto the tube holder.

FIGS. 5-7 show the tube assembly 20 being inserted into the tube holder 30 for use. Because of the design of the tube holder 30, the tube assembly 20 can be easily inserted into the tube holder, even while using only one hand. To insert the tube assembly 20, it can be grasped for example using only the thumb and the forefinger (and/or the middle finger) of the same hand. The tube 22 first is angled relative to the tube-channel axis 40 and then the tube cap 24 is inserted into the receptacle/gap 56 between the clamp-arm ledge surface 54 and the first retaining surface 58*a*, as shown in FIG. 5. When doing this, the top surface 25 of the tube cap 24 is pressed against the first retaining surface 58*a* so that the contact point 72 between them functions as a fulcrum about which the tube 22 can pivot. Then a lateral force is applied (e.g., by the thumb) to the tube 22 to pivot it into the tube channel 38 through its front/lateral access opening 42, as shown in FIG. 6, with the clamp arms 46 resiliently deflecting laterally outward until the tube is securely received in the tube channel with the clamp arms returned inwardly to the use position, as shown in FIG. 7. Because the tube 22 is angled (relative to the tube-channel axis 40) and pivoted laterally into the tube channel 38, the tube pries apart the clamp arms 46 beginning at their tops and gradually working downward to their bottoms, which tends to make the insertion smooth and easy.

The tube 22 is now captured in the tube channel 38 by the clamp arms 46, and the tube cap 24 is now captured in the receptacle/gap 56 by the clamp arm-top ledge surface 54 and the first retaining surface 58*a*. The cap 24 does not need to be received with a snug fit (e.g., the receptacle/gap 56 can be taller than it) in order for the tube assembly 20 to be securely held in place against axial movement, as typically the clamp arms 46 provide sufficient gripping forces to prevent this.

In the tube-insertion method shown, the tube holder 30 is mounted in place (e.g., to the homogenizer mount 14) and so it does not need to be grasped or otherwise secured in place in order to insert the tube assembly 20. Alternatively, the tube assembly 20 can be mounted to the tube holder 30 before the tube holder is mounted in place. To do so, the user can simply slip a finger (e.g., the forefinger or middle finger) from behind the tube (and below the tube holder) up to behind the tube holder.

In another alternative insertion method, the tube 22 can be vertically positioned (generally parallel to the tube-channel axis 40) and inserted laterally straight into the tube channel 38 without pivoting. However, the tube 22 then pries apart the clamp arms 46 along their entire length (height) simultaneously, so this method tends to not be as smooth and easy.

After use, the tube assembly 20 can be removed from the tube holder 30 by reversing the process. So the tube assembly 20 can be grasped in the same way by one hand, a holding force can be applied by one finger (e.g., the thumb) to the cap 24 or other upper portion of the tube assembly 20, and a lateral pivot force applied to the lower access-portion 29 the tube 22 to pivot it out of the tube channel 38 through its front opening side 42.

Figure 8:
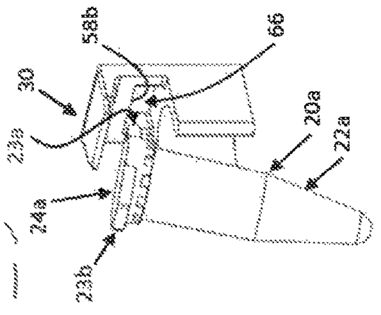
FIG. 8 is a perspective view of the tube holder of FIG. 1, showing an alternative sample tube in a ready positioned according to a method of installing the tube onto the tube holder.
Figure 9:
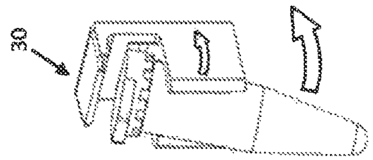
FIG. 9 shows the alternative tube being pivoted into the tube holder of FIG. 8 according to the method of installing the tube onto the tube holder.
Figure 10:
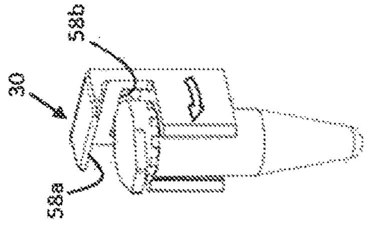
FIG. 10 shows the alternative tube and the tube holder of FIG. 9 in a use position according to the method of installing the tube onto the tube holder.

FIGS. 8-10 show the tube holder 30 used with a different type of tube assembly 20*a* that includes a tube 22*a* having a conical lower section and a cap 24*a* that pivots between open and closed positions, with the cap including a laterally-extending tab 23*a* and an opposite-positioned hinge 23*b*. The cap tab 23*a* inserts into the retainer opening 66 and in the use position (FIG. 10) is retained in place by the second retaining surface 58*b*, for example using the same one-handed pivotal insertion method. Alternatively, the tube assembly 20*a* can be inserted into the tube holder 30 with the hinge 23*b* leading so that it is received into the tube-holding opening 66 and retained by the second retaining surface 58*b*. The tab 23*a* or hinge 23*b* do not need to be received with a snug fit (e.g., the retainer opening 66 can be taller than them) in order for the tube assembly 20*a* to be securely held in place against axial movement, as typically the clamp arms 46 provide sufficient gripping forces to prevent this. In addition, for use with dramatically tapered (e.g., generally conical) or non-conical-shaped tubes, four arms can be provided with different spacings and/or shapes.

Figure 11:
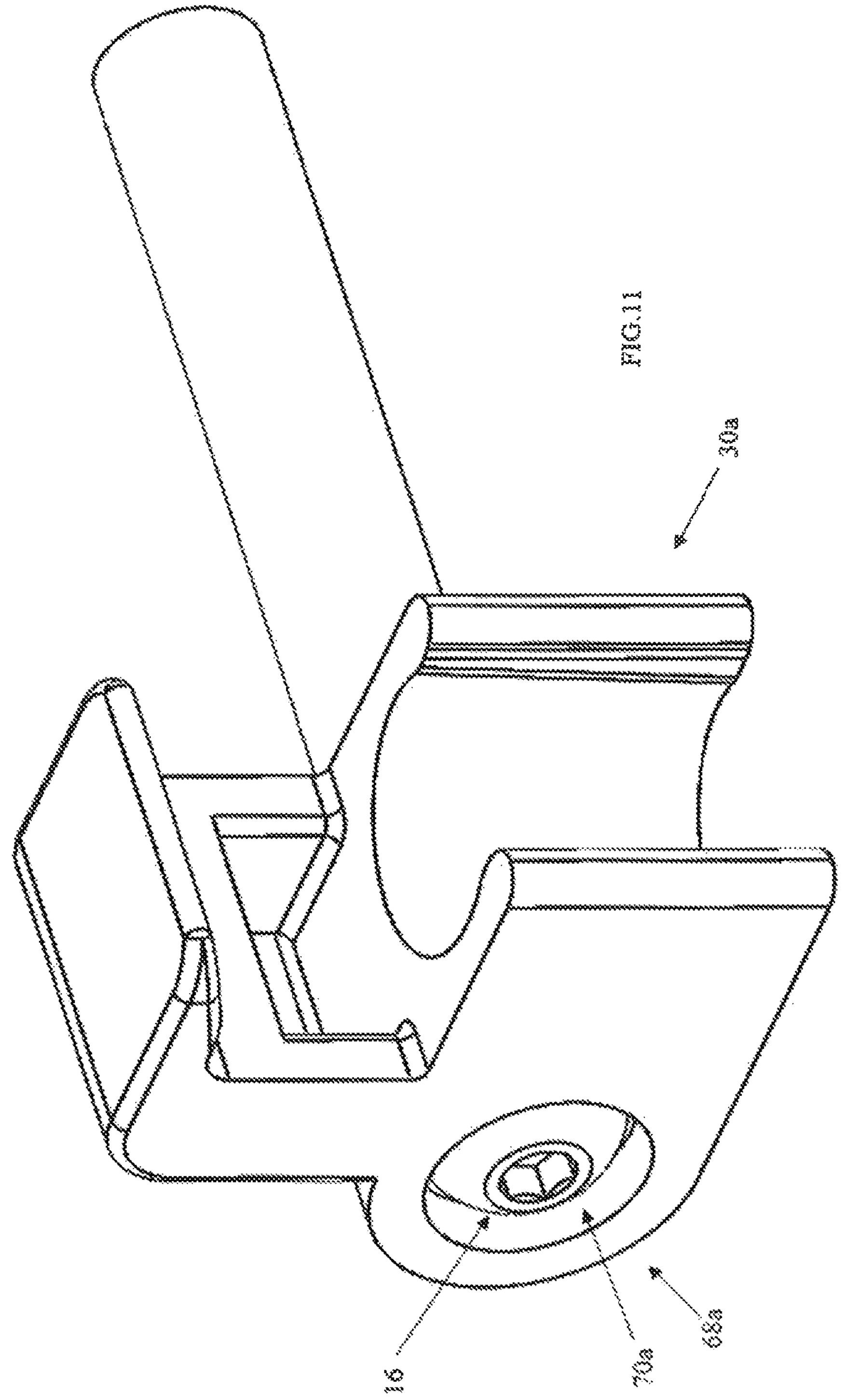
FIG. 11 is a perspective view of a tube holder according to a first alternative embodiment of the present invention, shown with a first alternative mount to a homogenizing device.
Figure 12:
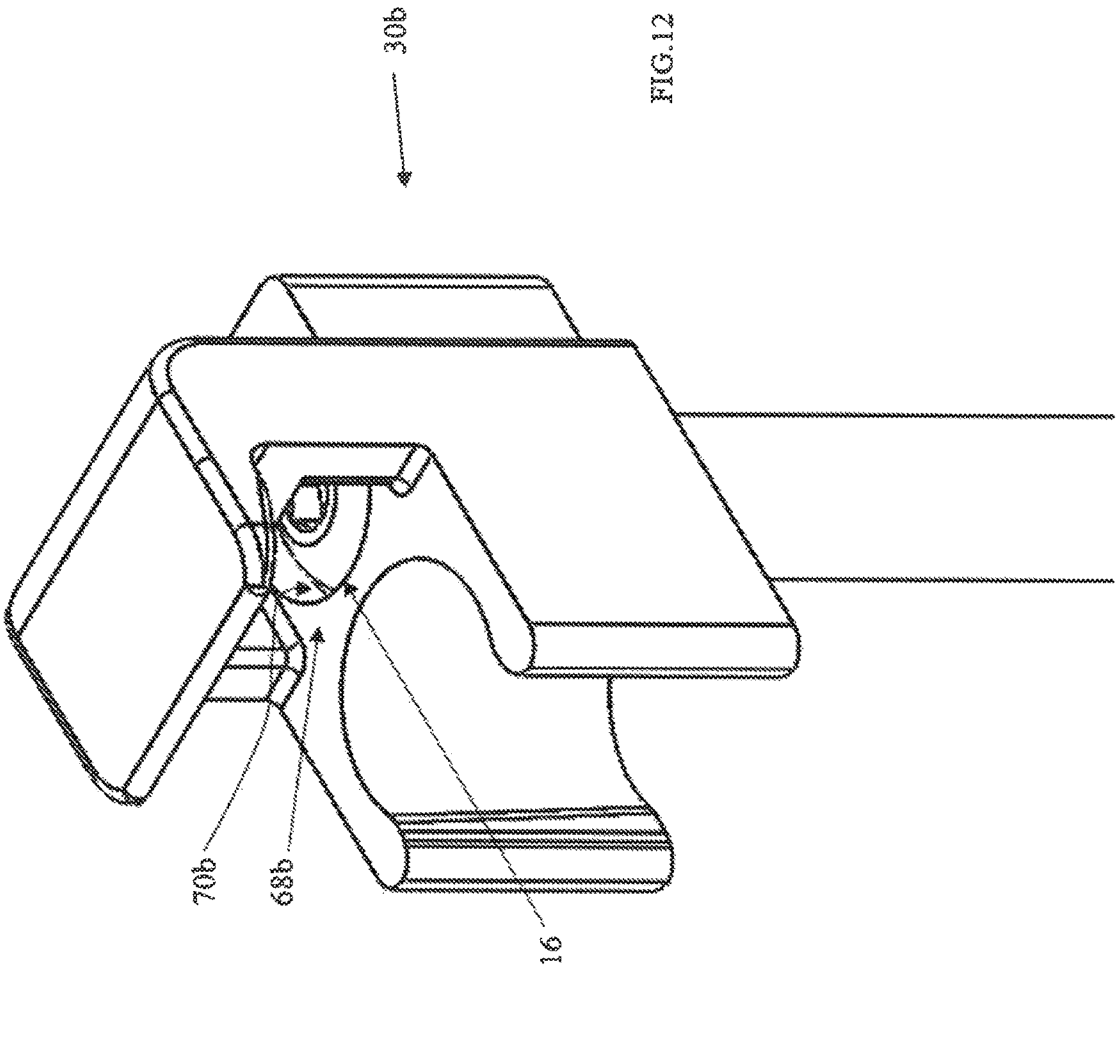
FIG. 12 is a perspective view of a tube holder according to a second alternative embodiment of the present invention, shown with a second alternative mount to a homogenizing device.
Figure 13:
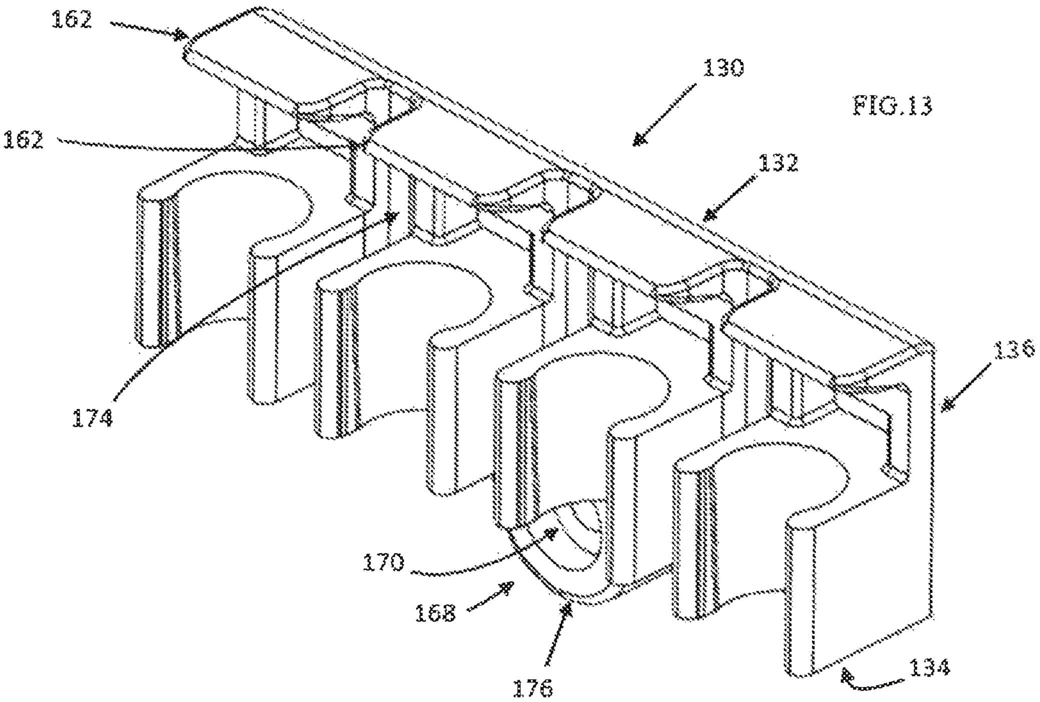
FIG. 13 is a perspective view of a multi-tube holder according to a second example embodiment of the present invention.
Figure 14:
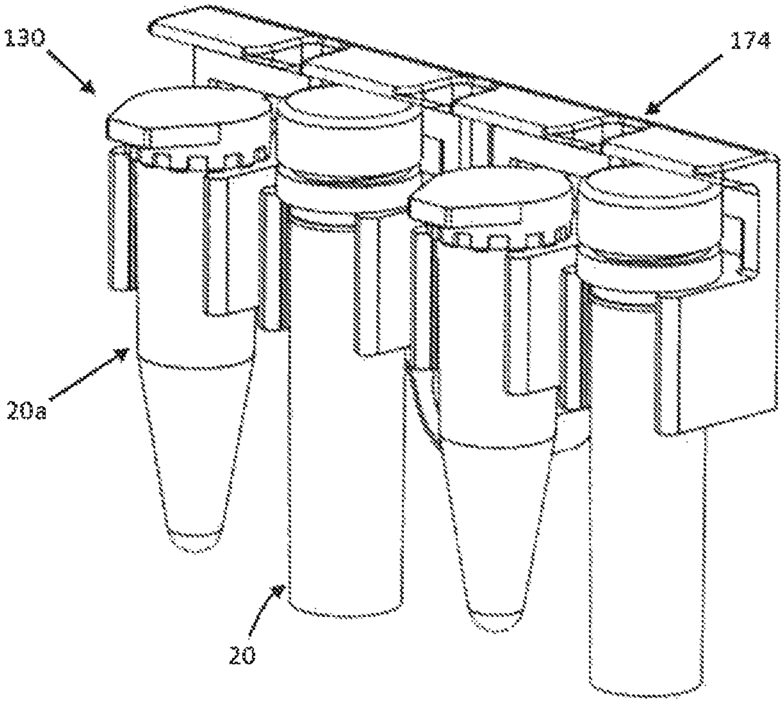
FIG. 14 is a different perspective view of the multi-tube holder according of FIG. 13, shown in use holding a plurality of sample tubes.
Figure 15:
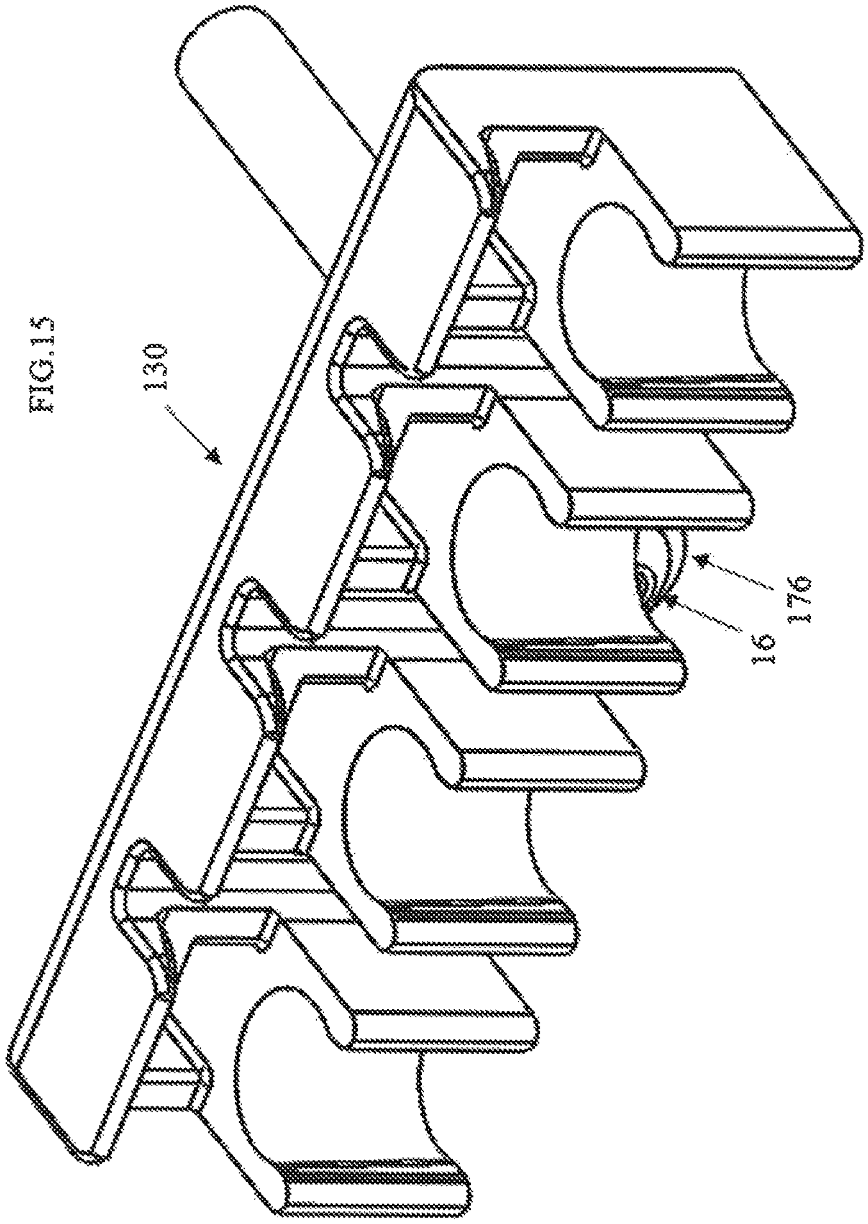
FIG. 15 is a perspective view of the multi-tube holder of FIG. 13, shown with a mount to a homogenizing device.
Figure 16:
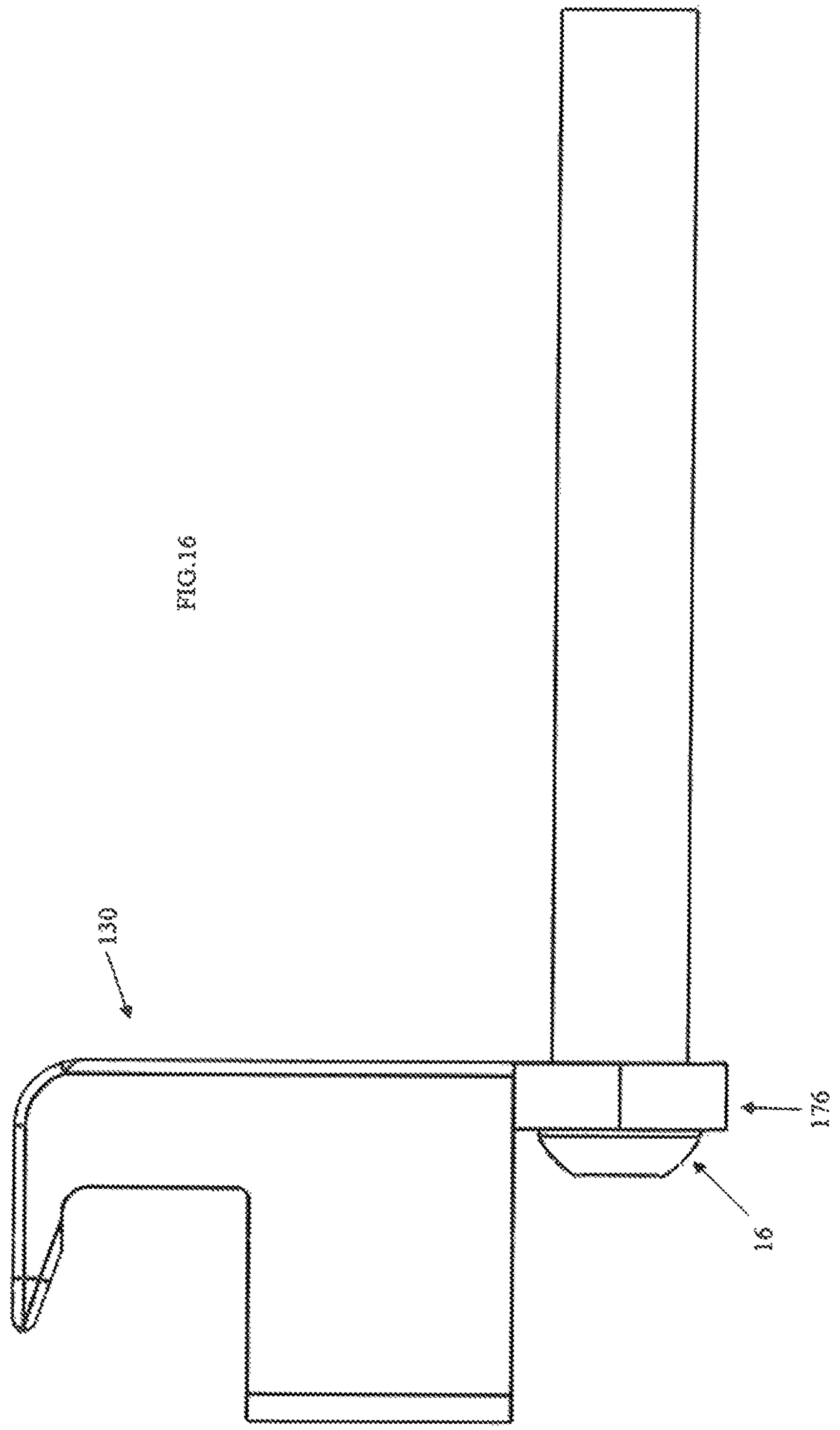
FIG. 16 is a side view of the multi-tube holder and mount of FIG. 15.
Figure 17:
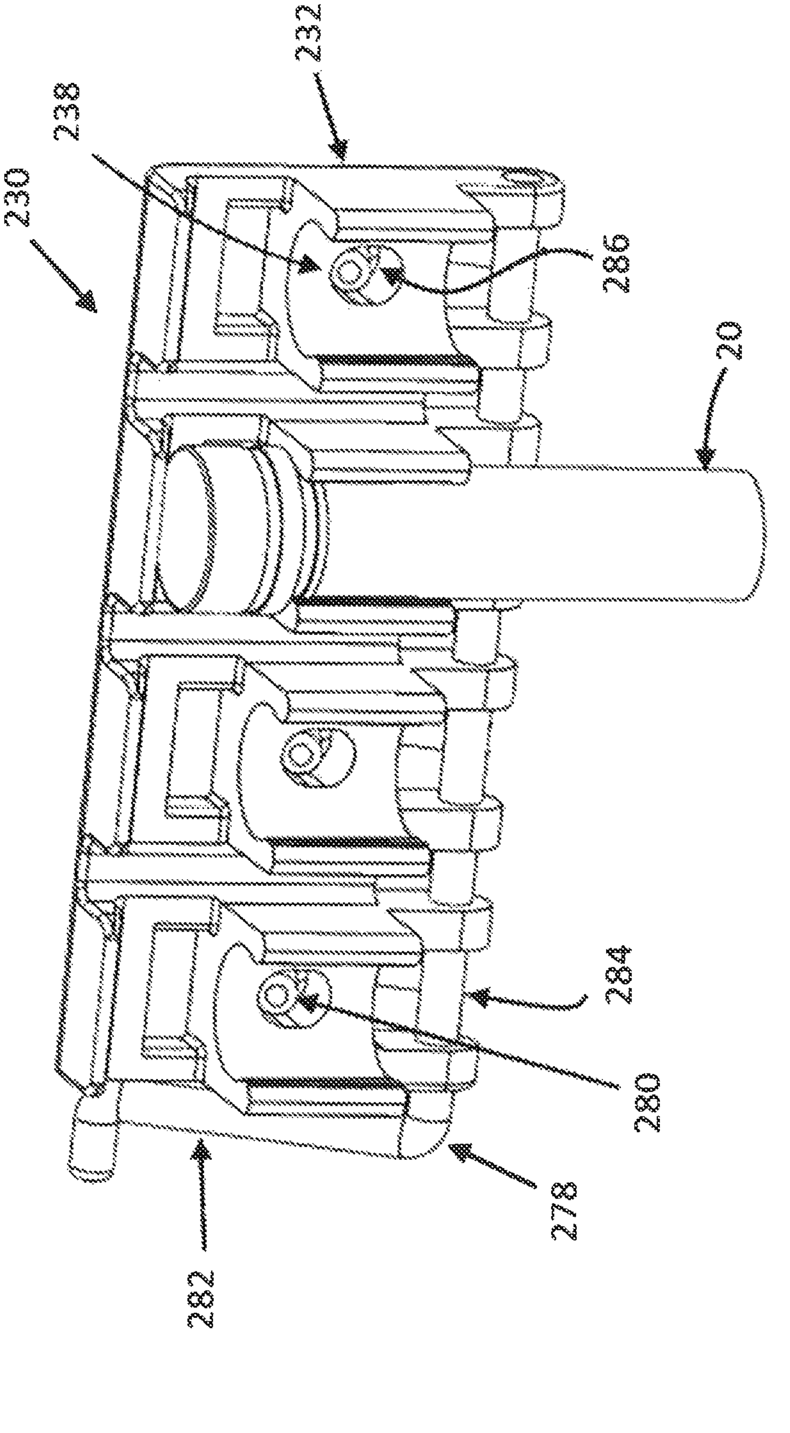
FIG. 17 is a perspective view of a multi-tube holder according to a third example embodiment of the present invention, shown in use holding one of a plurality of sample tubes and showing an ejection mechanism in a retracted position.
Figure 18:
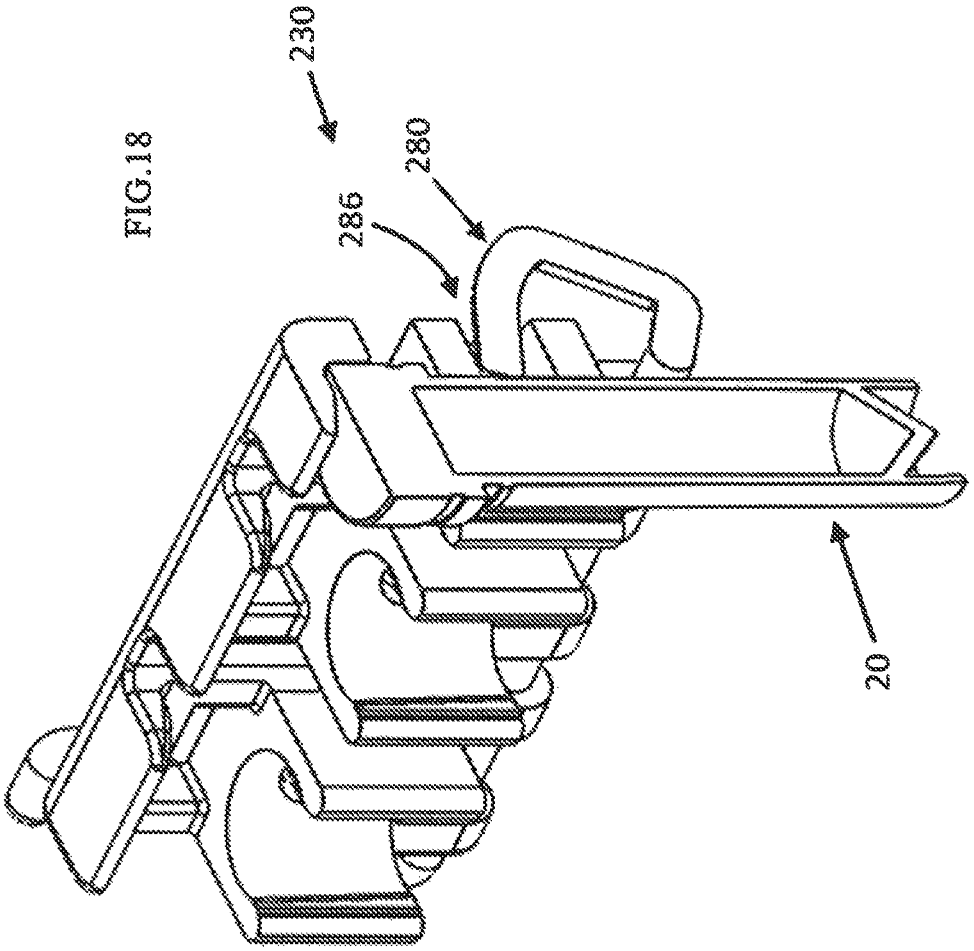
FIG. 18 is a perspective cross-sectional view of the multi-tube holder and sample tube of FIG. 17.
Figure 19:
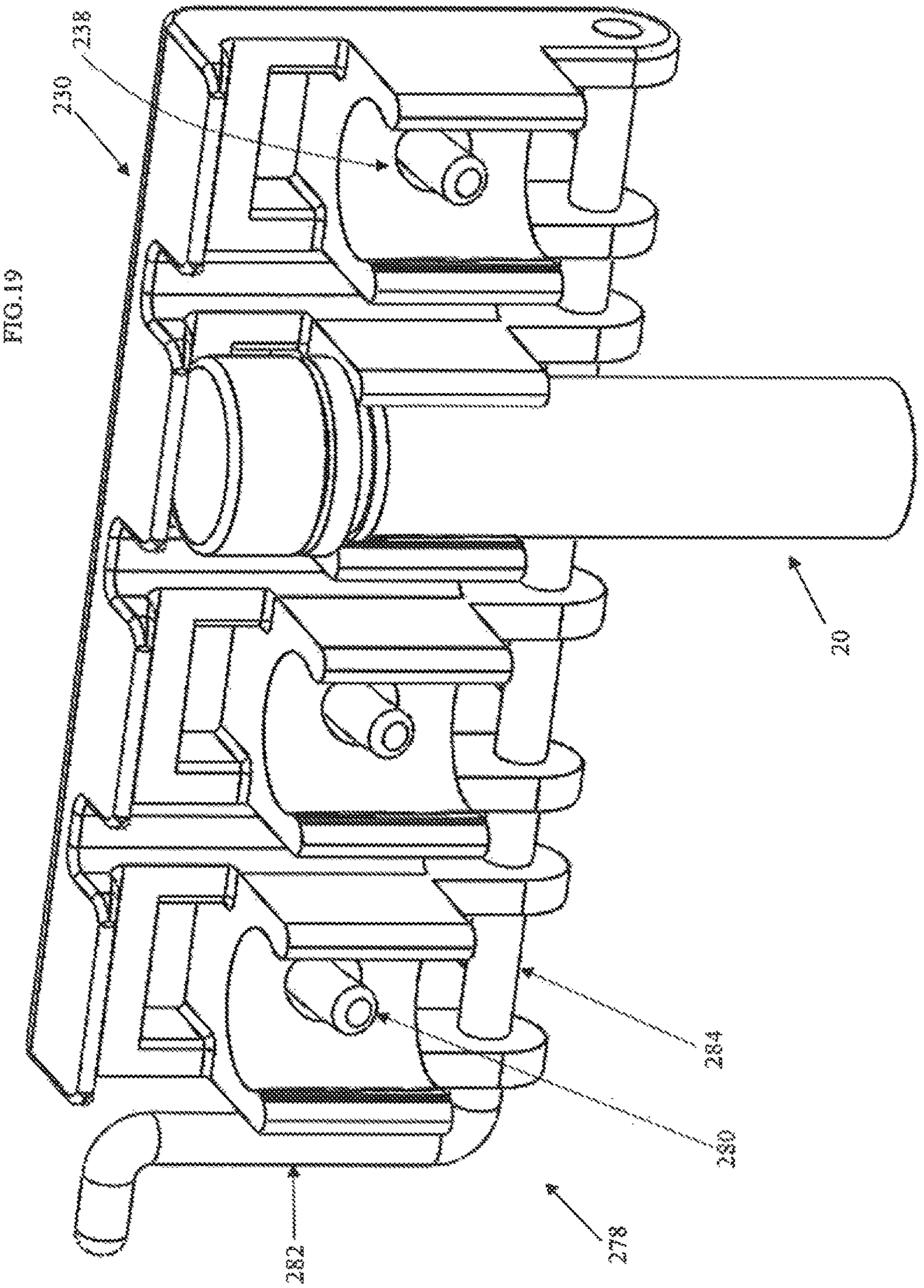
FIG. 19 shows the multi-tube holder and sample tube of FIG. 17 with the ejection mechanism in an extended position.
Figure 20:
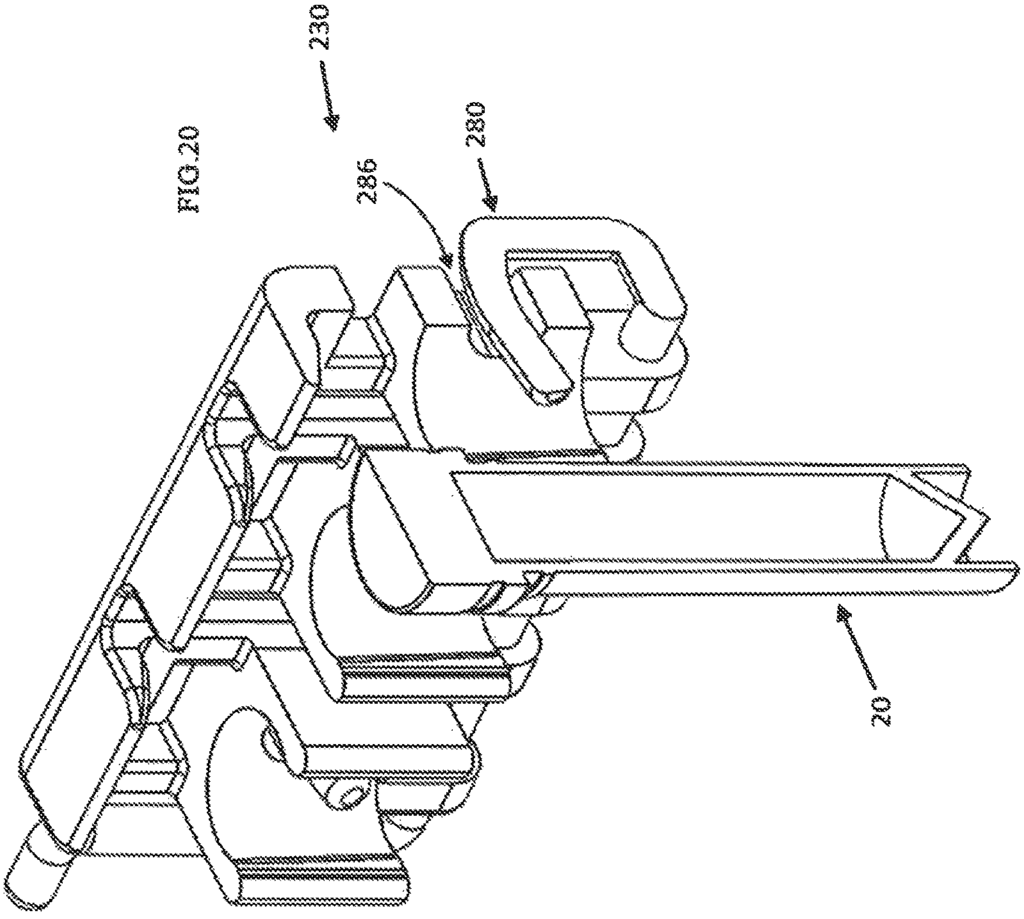
FIG. 20 is a perspective cross-sectional view of the multi-tube holder and sample tube of FIG. 19.

FIGS. 11-12 show first and second alternative tube holders 30*a* and 30*b* with different tube-holder mounts 68*a* and 68*b*, respectively. In particular, the tube-holder mounts 68*a* and 68*b* of these embodiments are substantially similar to that of the first embodiment, except that the opening 70*a* for the mounting fastener 16 is oriented laterally side-to-side in FIG. 11 and except that the counter-sunk opening 70*b* is oriented vertically in FIG. 12.

FIGS. 13-16 show a tube holder 130 according to a second example embodiment of the invention. In this embodiment, the tube holder 130 includes a series of tube clamps 134 and cap retainers 136 for holding a plurality of tube assemblies 20 and/or 20*a* for simultaneous or gang processing. The main body 132 thus includes one or more connecting members 174 extending laterally between and connecting the serial tube clamps 134 and cap retainers 136. The connecting members 174 can be in the form of walls (as depicted), arms, or other rigid structures, with at least one connecting member between and connecting each two adjacent sets of tube clamps 134 and cap retainers 136. In the depicted embodiment, the transverse arms 162 of the cap retainers 136 are discrete and dedicated for each tube assembly 20 or 20*a*, but if desired they can form a continuous structure. In addition, the tube-holder mount 168 of this embodiment includes a lower extension wall 176 in which is formed the opening 170 for the fastener 16. In just one of many such embodiments, the tube-holder body 132 includes four of the tube channels 138 with a width of for example about 7.0 cm to about 9.0 cm.

FIGS. 17-20 show a tube holder 230 according to a third example embodiment of the invention. The tube holder 230 of this embodiment is substantially similar to that of the second embodiment, but it additionally includes an ejection mechanism 278 for removing the tube assemblies 20. The ejection mechanism 278 includes at least one displacer 280 that is operably coupled to at least one actuator 282. Each displacer 280 moves between a retracted position (FIGS. 17-18) withdrawn from a respective tube channel 238 and an extended position (FIGS. 19-20) protruding into the tube channel to contact and thereby displace (remove) the respective tube 22. In the depicted embodiment, the ejection mechanism 278 includes a series of the displacers 280, a respective one for each tube channel 238, interconnected by a connecting member 284 that is connected to a single actuator 282 for gang operation. The displacers 280 can be in the form of pivotal elements such as pins or rods that insert through displacer openings 286 in the tube-holder body 232, as depicted. The connecting member 284 is rotationally coupled to the tube-holder body 232 to guide the pivotal motion of the displacers 280. And the actuator 282 is in the form of a lever arm extending from the connecting member 284 and pivotal to control the pivotal motion of the displacers 280 between their retracted and extended positions. In operation, the ejection mechanism 278 provides mechanical advantage for the displacers 280 to overcome the gripping force of the clamp arms as the displacers move toward the extended position.

The ejection mechanism can be provided in a number of other forms than that shown and described herein. For example, the displacers can move linearly between retracted and extended positions, the displacers in the extended position can be below the clamp arms (so no displacer openings are needed), the displacers can be positioned to contact and push on the caps (instead of the tubes), each displacer can have its own dedicated actuator for individual tube-removing operation, and/or the actuator can be provided by a push-button, slide, rotary, or other conventional actuating structure for controlling the position of the displacers.

Moreover, the ejection mechanism can be included in tube holders of other designs than those described herein. For example, the ejection mechanism can be included in a tube holder having a tube channel with a lateral access opening but not a retainer or with only one retaining surface.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms “a,” “an,” and “one” include the plural, the term “or” means “and/or,” and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A tube holder for holding a tube assembly and for mounting to a sample-processing device, the tube assembly including a tube and a cap for holding a sample, the tube holder comprising:

at least one clamp that securely holds the tube against transverse movement relative to the tube holder during processing of the sample, the clamp defining a tube channel with a longitudinal axis, an access opening extending transversely and communicating with the tube channel, and a ledge surface that is generally transverse to the channel axis, wherein the tube is insertable into and removable from the tube channel through the transverse access opening, wherein the transverse ledge engages a first edge surface of the tube or the cap when the tube is held in the tube channel in a use position, and wherein the tube channel has a transverse dimension and the transverse access opening has a transverse dimension that is smaller than the tube-channel transverse dimension to restrain the tube in the tube channel from transverse movement during processing; and at least one retainer that securely retains the cap against axial movement relative to the tube holder during processing of the sample, the retainer defining a first retaining surface that is positioned opposite and spaced from the transverse ledge, and that extends generally transversely to the channel axis and over the tube channel to engage an opposite second edge surface of the cap in the use position, wherein the first retaining surface and the transverse ledge cooperatively form a receptacle that receives and retains the cap therein and that restrains the tube from axial movement during processing of the sample, wherein the first retaining surface is ramped downward away from the transverse access opening to accommodate size variations of the tube cap.

2. The tube holder of claim 1, wherein the clamp includes two arms that are spaced apart to define the tube channel and the transverse access opening, and wherein the clamp arms define the transverse ledge.

3. The tube holder of claim 2, wherein the clamp arms each have a tip, and the transverse access opening is defined by and between the two clamp-arm tips.

4. The tube holder of claim2, wherein the clamp has a resilient feature that enables resilient deflection of at least a portion of the clamp during and in response to insertion and removal of the tube relative to the tube channel.

5. The tube holder of claim 4, wherein at least a portion of at least one of the clamp arms resiliently deflects transversely outward in response to the tube being forced against it and into or out of the tube channel.

6. The tube holder of claim 1, wherein the clamp has a resilient feature that enables resilient deflection of at least a portion of the clamp during and in response to insertion and removal of the tube relative to the tube channel.

7. The tube holder of claim 1, wherein in the use position the tube channel securely holds the tube against transverse movement during processing with the transverse access opening remaining open and unclosed by any additional structure.

8. The tube holder of claim 1, wherein the tube assembly can be easily pivoted into and out of the tube channel using only one hand.

9. The tube holder of claim 8, wherein, during use to load the tube into the tube holder with the tube holder mounted to the sample-processing device, the tube can be angled relative to the tube-channel axis, then the tube cap can be inserted into the receptacle between the clamp-arm ledge surface and the first retaining surface so that the tube cap is pressed against the first retaining surface with a contact point therebetween forming a fulcrum about which the tube can pivot, and then a lateral force can be applied to the tube to pivot it into the tube channel through the transverse access opening.

10. The tube holder of claim 1, wherein the retainer extends generally transversely from an upright member that in turn extends generally axially from the clamp.

11. The tube holder of claim 1, wherein a series of the clamps and the retainers are positioned in a side-by-side arrangement and interconnected by a connecting element for forming a multi-tube holder.

12. The tube holder of claim 11, further comprising an ejection mechanism that is operable to eject the tubes from the tube channels, wherein the ejection mechanism includes at least one displacer that is operably coupled to at least one actuator and that moves between a retracted position withdrawn from a respective one of the tube channels and an extended position protruding into the respective tube channel to contact and thereby displace the respective tube.

13. A tube holder for holding a tube assembly and for mounting to a sample-processing device, the tube assembly including a tube and a cap for holding a sample, the tube holder comprising:

at least one clamp that securely holds the tube against transverse movement relative to the tube holder during processing of the sample, the clamp defining a tube channel with a longitudinal axis, an access opening extending transversely and communicating with the tube channel, and a ledge surface that is generally transverse to the channel axis, wherein the tube is insertable into and removable from the tube channel through the transverse access opening, and wherein the transverse ledge engages a first edge surface of the tube or the cap when the tube is held in the tube channel in a use position; and at least one retainer that securely retains the cap against axial movement relative to the tube holder during processing of the sample, the retainer defining a first retaining surface that is positioned opposite and spaced from the transverse ledge, and that extends generally transversely to the channel axis and over the tube channel to engage an opposite second edge surface of the cap in the use position, wherein the first retaining surface and the transverse ledge cooperatively form a receptacle that receives and retains the cap therein, and the retainer defining a second retaining surface that is oriented oppositely and spaced from the transverse ledge, but spaced closer than the first retaining surface, to engage a portion of the cap, or of an alternative cap of an alternative tube assembly, in the use position.

14. The tube holder of claim 13, wherein the second retaining surface is transversely offset from and does not extend into the tube channel so that the second retaining surface does not interfere with the tube in the use position when the cap is retained by the first retaining surface.

15. The tube holder of claim 13, wherein the clamp includes two arms that are spaced apart to define the tube channel and the transverse access opening, and wherein the clamp arms define the transverse ledge.

16. The tube holder of claim 15, wherein the clamp arms each have a tip, and the transverse access opening is defined by and between the two clamp-arm tips.

17. The tube holder of claim 15, wherein the clamp has a resilient feature that enables resilient deflection of at least a portion of the clamp during and in response to insertion and removal of the tube relative to the tube channel.

18. A tube holder for holding a tube assembly and for mounting to a sample-processing device, the tube assembly including a tube and a cap for holding a sample, the tube holder comprising:

at least one clamp that securely holds the tube against transverse movement relative to the tube holder during processing of the sample, the clamp defining a tube channel with a longitudinal vertical axis, a lateral access opening extending transversely and communicating with the tube channel, and a lateral ledge surface that is generally transverse to the channel axis, wherein the clamp include two arms that are spaced apart to define the tube channel, that each have a respective tip between which is defined the lateral access opening, and that define the transverse ledge, wherein the tube is insertable into and removable from the tube channel through the lateral opening, wherein the tube channel has a lateral dimension and the lateral opening has a lateral dimension that is smaller than tube-channel lateral dimension to restrain the tube in the tube channel from lateral movement during processing, wherein the clamp has a resilient feature wherein at least a portion of at least one of the clamp arms resiliently deflects laterally outward in response to the tube being forced against it and into or out of the tube channel, and wherein the lateral ledge engages a bottom-facing edge surface of the tube or the cap when the tube is held in the tube channel in a use position;

a first retainer that securely retains the cap against axial movement relative to the tube holder during processing of the sample, the first retainer defining a first retaining surface that is positioned opposite and spaced from the lateral ledge, and that extends generally transversely to the channel axis and over the tube channel to engage a opposite top edge surface of the cap in the use position, wherein the first retaining surface and the lateral ledge cooperatively form a receptacle that receives and retains the cap therein and that restrains the tube from axial movement during processing of the sample; and a second retaining surface that is oriented oppositely and spaced from the lateral ledge, but spaced closer than the first retaining surface, to engage a portion of the cap, or of an alternative cap of an alternative tube assembly, in the use position, wherein the second retaining surface is laterally offset from and does not extend into the tube channel so that the second retaining surface does not interfere with the tube in the use position when the cap is retained by the first retaining surface.

19. The tube holder of claim 18, wherein in the use position the tube channel securely holds the tube against lateral movement during processing with the lateral opening remaining open and unclosed by any additional structure, wherein the tube assembly can be easily pivoted into and out of the tube channel using only one hand.

20. The tube holder of claim 18, wherein a series of the clamps and the retainers are positioned in a side-by-side arrangement and interconnected by a connecting element for form a multi-tube holder.

* * * * *